No. 696,357. Patented Mar. 25, 1902.
O. WIEDERHOLD.
MACHINE FOR SATURATING MANTLE MATERIAL.
(Application filed Sept. 12, 1901.)
(No Model.) 2 Sheets—Sheet 2.
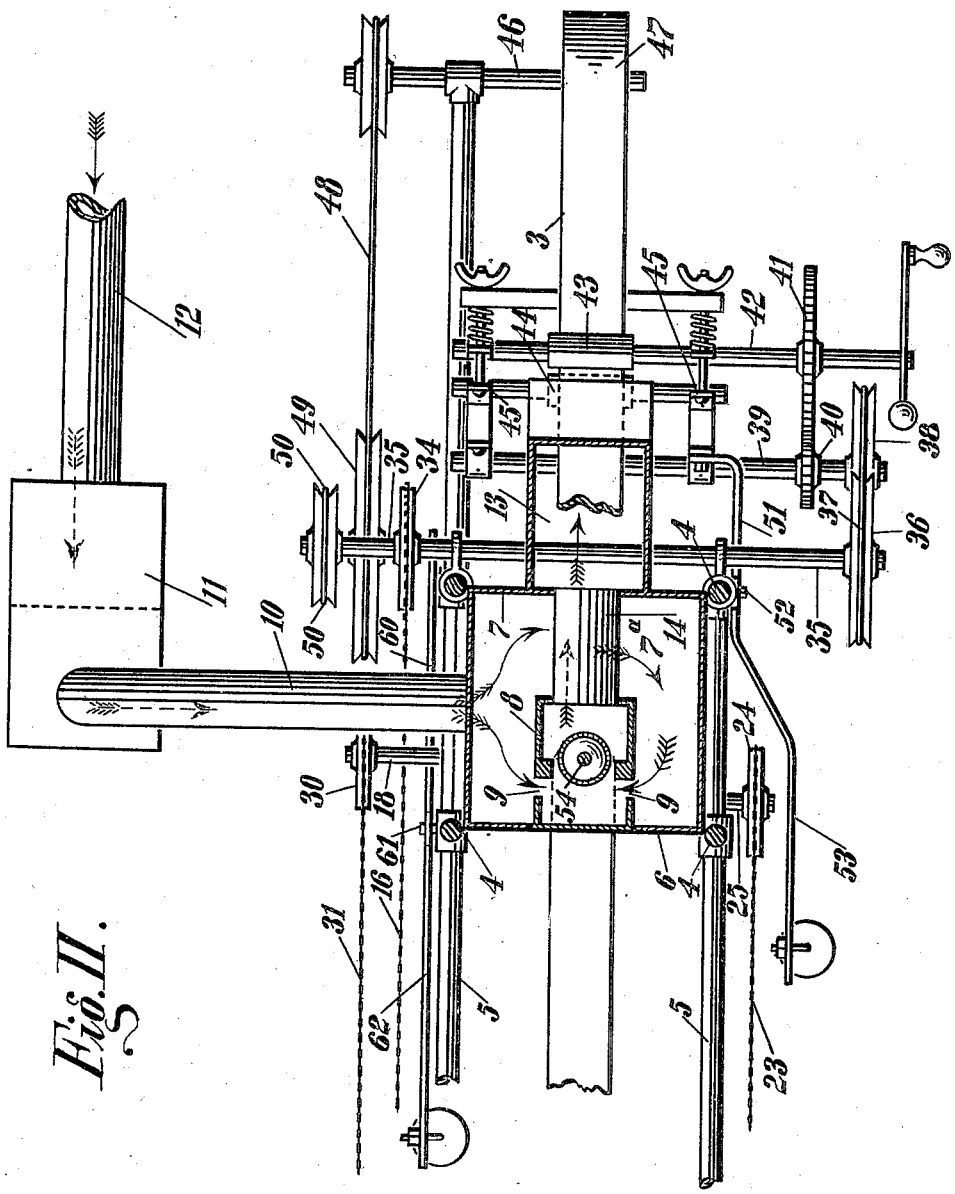
Fig. II.
WITNESSES:
INVENTOR:
Oscar Wiederhold
By
Kenneson Crain Emley & Rukis
His Attorneys

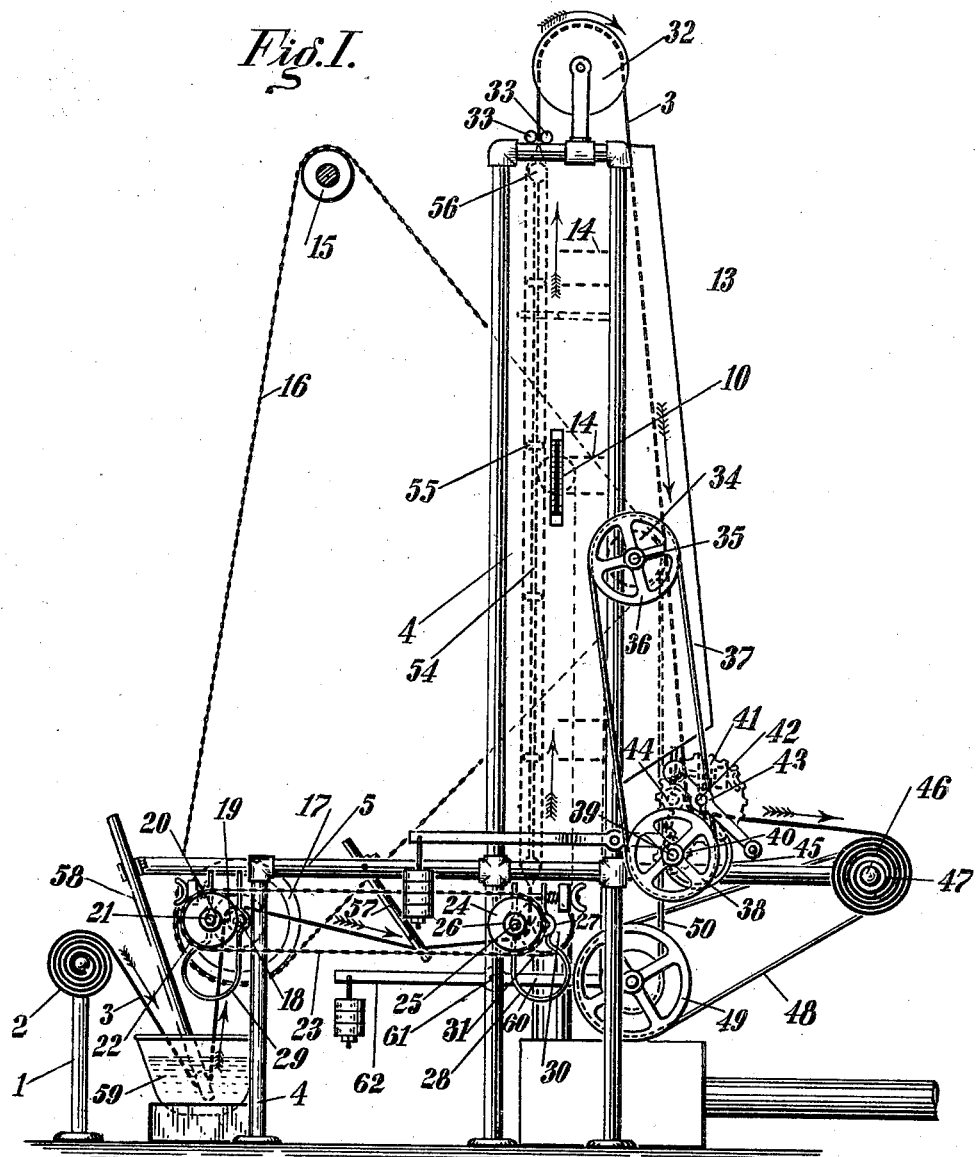

UNITED STATES PATENT OFFICE.

OSCAR WIEDERHOLD, OF BLOOMFIELD, NEW JERSEY.

MACHINE FOR SATURATING MANTLE MATERIALS.

SPECIFICATION forming part of Letters Patent No. 696,357, dated March 25, 1902.

Application filed September 12, 1901. Serial No. 75,144. (No model.)

*To all whom it may concern:*

Be it known that I, OSCAR WIEDERHOLD, a citizen of the United States, residing at Bloomfield, Essex county, New Jersey, have invented certain new and useful Improvements in Machines for Saturating Mantle Material, of which the following is a specification.

My invention relates to machines for saturating mantle material—that is to say, to machines for saturating material from which incandescent gas-mantles are afterward formed.

Heretofore it has been customary to knit the mantle material in a long tube, to cut it into suitable lengths for forming up into mantles, and to saturate these cuttings. By my invention, however, I saturate the tubing before cutting it into mantle lengths, and thereby bring about a rapid and thorough saturation, which is highly economical and results in a more perfect thoroughly even product.

Of course there are many forms of machine in which my invention may be embodied.

In the accompanying drawings I have shown one form of machine which has been practically operated by me to successfully produce commercial mantle material.

In the drawings, Figure I is a side elevation of the machine; and Fig. II is a sectional plan view thereof, the rear of the machine being to the right of the figure.

In the drawings, 1 represents a suitable standard or support, which carries a roller 2, containing a long length of mantle-webbing 3.

4 4 are standards of the machine, and 5 represents horizontal bars which aid to support various operating parts.

6 is a drying-chamber, preferably divided by partition 7 into two compartments, through which the mantle-webbing passes in succession. One of these compartments 7ᵃ contains a box 8, having openings 9 in its side and communicating through pipe 10 with an air-filter 11, which receives hot air from a pipe 12, supplied by a suitable blower and air-heating device (not shown) and through compartment 13 communicates with the box 8 by pipes 14, through which a supply of hot air passes, as shown by the arrows.

A driving-pulley 15 is provided with a chain or belt 16, which passes around a wheel or pulley 17 on shaft 18, which shaft carries a suitable squeezing-roll 19, which coöperates with a roll 20 to squeeze the webbing as it passes therethrough.

The roller 20 is carried by the shaft 21, which shaft is provided with a gear 22, around which passes a sprocket-chain 23, which drives the gear 24 on a shaft 25. This shaft 25 carries a roller 26, which coöperates with a roller 27 to guide the mantle-webbing. A spring 28 holds the rolls 27 and 26 firmly together, and a spring 29 performs a like office for the squeezing-rolls 20 and 19.

The roll 27 is driven by a sprocket 30, which sprocket receives its motion from the shaft 18 by suitable sprocket-chain 31. A roll 32 is provided at the top of the machine, and the mantle-webbing 3, passing from the box 8 between the guide-rollers 33, passes over this roller, thence downward into and through the compartment 13.

The chain 16 drives the gear 34 on the shaft 35. A pulley 36 is connected by a band or belt 37 with a pulley 38, carried upon a shaft 39, provided with a pinion 40, meshing with a pinion 41 on a shaft 42, carrying a roll 43, under which the mantle-webbing passes. A roll 44 is held firmly against the roll 43 by a spring 45 and is frictionally driven from said roll. The shaft 46 carries a roller 47, upon which the mantle-webbing is wound. This roller is suitably driven by a belt 48, driven from a wheel 49, which receives its motion by a belt 50 from the shaft 34. The shaft 39 and the shafts of the rollers 44 and 43 are suitably carried upon a frame 51, which is pivoted at 52 and is provided with a rearwardly-extended weighted arm 53, so that the shaft 39 and the rollers may be tilted should the tension become too great, as will be hereinafter explained.

Contained within the box 8 is a glass rod 54, provided at intervals with spreaders 55 and at its ends with balls 56. A fork 57 serves to guide the mantle-webbing after it leaves the squeezing-rollers, and the glass fork 58 serves to guide the mantle-webbing into the vessel 59 below the surface of a saturating fluid contained within the said vessel.

The shaft of the wheel 49 is mounted upon an arm 60, pivoted to the framework at 61 and provided with a rearwardly-extending weighted arm 62.

Before proceeding to describe the detailed operation of the construction shown in the drawings I desire to state that commercial considerations require that mantles offered for sale to the public should be accurately shaped, and in order to do so the webbing from which they are made should not be subjected to any unequal or irregular strain. Consequently in order to secure the best results the mantle-webbing is passed through the machine in substantially a single plane and is kept under substantially uniform tension throughout its cross-section at every point in its travel. The mantle-webbing, which, as before stated, is in the present instance in the form of a tube, passes from the roller 2 under the fork 58 and beneath the surface of the saturating liquid in the vessel 59, the fork 58 being adjustable for obvious reasons. The mantle-webbing then passes between the squeezing-rollers and thence below the fork 57 to the lower set of guiding-rollers 26 27. It thence passes over the glass rod 54, which glass rod is freely movable and is held suspended by the moving mantle-webbing in the position shown in the drawings. This glass rod is inserted into the interior of the mantle-webbing while the webbing is being threaded through the machine in beginning the operation. The mantle-webbing passing around the glass rod passes through the drying-box 8 of the drying apparatus, thence between the upper set of rollers 33, over the roller 32, and thence downward through the rear chamber or compartment 13 of the drying apparatus, and thence passes to the guide-rollers on the swinging tension device and is then wound upon the roller 47. Thus in its passage through the machine the mantle-webbing is first saturated and then squeezed. It is then spread out, so that the hot air in the drying-chamber will thoroughly and evenly act upon it, and is carried untwisted in substantially a single plane throughout the entire operation.

If for any reason during the time that the mantle is traveling through the machine the tension thereon increases to greater degree, the pivoted tension device would relieve the tension of the mantle-webbing. This is a highly-important feature of the invention in that it prevents the mantle from being subjected to too great a tension at any time or to too irregular a tension, both of which would produce deleterious effects in the finished product, as it is well known that the stretch of the mantle material will render it difficult to form and shape up the mantle and will also, by producing compaction of the threads, compact the thoria and produce objectionable effects in the mantle.

Having described my invention, what I claim, and desire to secure by Letters Patent, is—

1. In a machine for saturating mantle-tubing the combination of a saturating device and a drying device provided with means for maintaining the tubing in an open or distended condition in the drying device.

2. In a machine for saturating mantle-tubing the combination of a saturating device, a drying device and a freely-movable tubing opening or distending device adapted to be surrounded by the mantle in its passage through the drying device.

3. In a machine for saturating mantle-tubing the combination of a saturating device, propelling devices, a drying device and a rod located in the drying device and freely movable with respect thereto, over which rod the mantle-tubing is adapted to be drawn, whereby the mantle-tubing will be efficiently dried in its passage over the rod.

4. In a machine for saturating mantle-tubing the combination of a saturating device, propelling devices and a spreader-rod adapted to be inclosed by the mantle-tubing and having enlargements thereon for spreading the mantle.

5. In a machine for saturating tubing the combination of a saturating device, means for propelling the tubing in the machine, a drying-chamber with means for supplying air thereto, and means for maintaining the tubing in an open or distended condition in the drying device.

6. In a machine for saturating tubing, the combination of a saturating device, means for maintaining the tubing in an open or distended condition after it leaves the saturating device, and a drying-chamber provided with two compartments side by side, and air-conveying ducts intervening between the compartments.

7. In a machine for saturating tubing the combination of a saturating device and propelling device for the tubing, a drying device, means for maintaining the tubing in an open or distended condition and a tension device for maintaining an even tension on the tubing substantially as described.

8. In a machine for saturating mantle material in the form of tubing, the combination of a saturating device and a drying device including means for maintaining the walls of the tubing out of contact with each other, and a tension device for maintaining an even tension on the goods.

OSCAR WIEDERHOLD.

Witnesses:
GEO. E. MORSE,
ARTHUR RUSSELL.